United States Patent Office 3,118,788
Patented Jan. 21, 1964

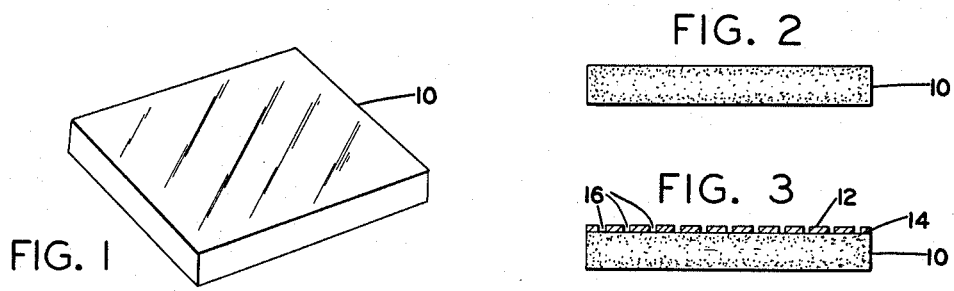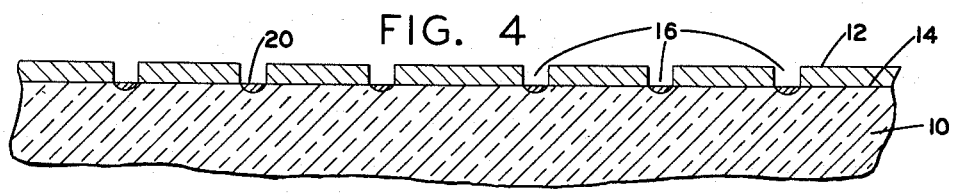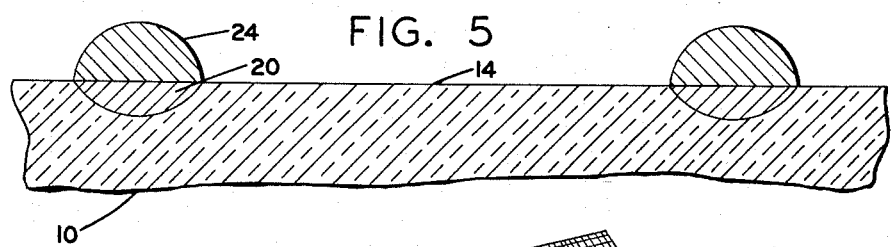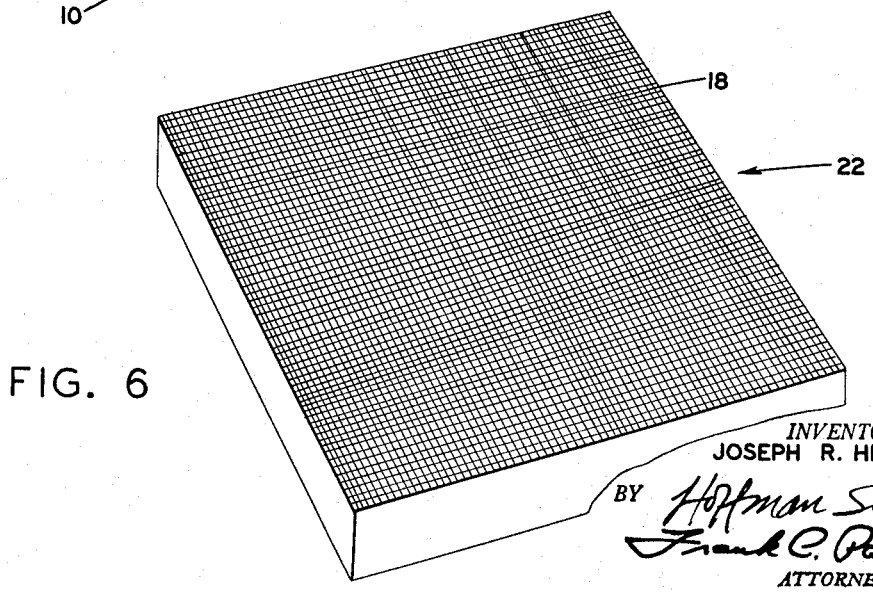
INVENTOR.
JOSEPH R. HENSLER
ATTORNEYS

3,118,788
METALLIC SURFACE GLASS ARTICLE
Joseph R. Hensler, Rochester, N.Y., assignor to Bausch
 & Lomb Incorporated, Rochester, N.Y., a corporation
 of New York
Original application Dec. 7, 1956, Ser. No. 627,067, now
 Patent No. 2,999,339, dated Sept. 12, 1961. Divided
 and this application Feb. 6, 1961, Ser. No. 87,443
3 Claims. (Cl. 117—212)

This invention relates to improved matrices for use in the manufacture of metallic grids, of extremely fine mesh, for electronic equipment and the like.

This application is a division of my copending application Serial Number 627,067, filed December 7, 1956, now Patent Number 2,999,339.

In devices of this general character, it is customary to employ an etching procedure either in the manufacture of a transparent marking on a dark background or a black marking on a transparent background. In the former case, lead glass is heated in the presence of a reducing agent, such as hydrogen, at a certain temperature for a certain period of time, in order to produce a thin coat of metallic lead on and in the surface of the glass device. A suitable acid resist such as reticle wax is then employed after the glass device has cooled, and engravings of the desired marking or design is made through the resist, whereupon etching material is sprayed or otherwise applied to the surface of the glass in order to expose the clear glass immediately beneath the engravings which were made through the acid resist.

In the manufacture of dark or black markings on a background of clear glass, an acid resist is applied to the surface of the glass, engravings made therethrough and the glass is sprayed with or otherwise brought in contact with an etching acid in order to form grooves in the surface of the glass for receiving a metallic or other material that will suitably represent the engravings.

By means of either of the processes outlined above, metallic grids or the like may be manufactured by simply engraving the desired grid design through the acid resists and after the design has been etched, by applying a coat of metal upon the glass surface, wiping the same off the surface to thereby enable the metal to adhere only to sides formed by the etched grooves and then form the desired grid through the process of electroplating the metal.

In both manufacturing processes discussed above, the "weak link" step, so to speak, is the etching of the glass surface. Through microscopic observations it has been found that etching, even under ideal laboratory controlled conditions, results in the formation of ragged-sided grooves. Consequently, the desired grids will be composed of metallic strands having coarse and uneven surfaces which, in normal use, will wear out accordingly. The most striking disadvantage in the use of etched grooves is the almost impossible task of controlling the application of the etching acids. More often than not, the depth and width of the grooves are unpredictable and will vary considerably from application to application. Therefore, it is the principal object of the present invention to provide an improved method of forming markings on glass which may be useful for manufacturing electronic grids or the like.

Another object of the present invention is to provide an improved matrix and means for producing the same that will insure true and clean reproduction of the pattern arranged on the matrix.

Another object of the invention is to provide an improved matrix of glass having an electroconductive surface and comprising various materials in composition percentages which will result in a surface resistivity of 0.001 to 10 ohms/square.

Still another object of the invention is to provide an improved glass of varying mixtures which may be subjected to heat in the presence of hydrogen for producing a concentration of metal in the exposed surface of the glass.

The present invention takes the form as follows: A glass sheet or blank, preferably of the type containing phosphates and silver, is ground and polished to a high degree. In order to provide a relatively high content of silver in the glass, phosphate is used as a constituent since this ingredient aids in the dissolution of the silver. It has been found experimentally that at least 8% silver phosphate content by weight in a glass blank is ideal for the practice of the present invention.

A thin layer of a suitable protective coating which is inert in and impenetrable by hot hydrogen gas is applied to one surface of the block and the desired pattern is engraved therethrough so as to expose the surface of the glass block. The glass block is placed in an oven and a hydrogen atmosphere is established therein. The oven is then heated to a required temperature for a required length of time in order to produce the desired density of reduced silver in the exposed surface of the glass blank. It has been found that best results are obtainable if this procedure is preceded by a preheating step before the glass block is coated with the protective coating. Such preheating will cause the silver ions to "migrate" toward the surfaces of the glass block to concentrate thereat so that during the reduction stage, more of the silver ions are reduced than could be realized for the normal silver content of the glass.

Heating of the block in hydrogen will reduce the silver ions to silver metal in the exposed surface of the block. With at least 8% silver phosphate in glass before the preheating step, the ohmic value for the resistance of the reduced silver surface will range between 0.001–10 ohms/square depending upon the preheat and reduction temperatures. It will be apparent that the electroconductivity of the surface is relatively high and that the reaction to electroplating treatment will be accordingly high. Thus, the building of metal resulting from this plating stage will be fast, easily controlled, and comprise a true and smooth arrangement of grid structure. Since the conductivity of the surface is high, the number of grid strands that can be produced by this process is equal to the number of engravings that can be made during the engraving stage. Consequently, the thinness of the strands would be proportional to the thinness of the engravings, so the specifications of the grids that could be manufactured by the present invention are only limited by the specifications of the engraving machinery.

Other objects and advantages will be apparent after reading the following specification taken in conjunction with the attached drawings in which:

FIG. 1 is a perspective view of a glass blank having at least one ground and polished surface.

FIG. 2 is a cross-sectional view of the blank of FIG. 1 after the same has been subjected to the preheating step.

FIG. 3 is a cross-sectional view of the blank after a protective coating has been applied to the polished surface thereof and a suitable design has been engraved thereon.

FIG. 4 is a fragmentary sectional view on a greatly enlarged scale of the surface portion of the blank of FIGS. 1–4 after metallic reduction by hydrogen.

FIG. 5 is similar to the enlarged portion of FIG. 4 but showing the blank after the same has been treated in electroplating process.

FIG. 6 is a perspective view of the blank of FIG. 1 showing the finished blank as a matrix for a metallic grid.

Referring more particularly to the drawing, the numeral 10 indicates a glass blank to be treated in accordance with the invention, the glass being of the type containing at least about 8% by weight silver phosphate.

The practice of the invention is applicable to glass composition within the range specified in the following table, batch basis:

| Material | Various Compositions (Percent by Weight) | | | | | | | | |
|---|---|---|---|---|---|---|---|---|---|
| | I | II | III | IV | V | VI | VII | VIII | Ranges (Percent by Weight) |
| Ag(PO₃) | 20 | 20 | 20 | 20 | 20 | 20 | 20 | 20 | 8–25 |
| Al(PO₃)₃ | 40 | 40 | 40 | 35 | 35 | 40 | 35 | 30 | 30–75 |
| Ba(PO₃)₂ | 20 | | 10 | 15 | 5 | 25 | 5 | 5 | 0–25 |
| K(PO₃)+Na(PO₃) | 20 | 20 | 20 | 20 | 20 | | 20 | 20 | 10–30 |
| Ca(PO₃)₂ | | 20 | 5 | | 5 | | | 5 | 0–20 |
| Mg(PO₃)₂ | | | 5 | | 5 | | | 5 | 0–10 |
| B₂O₃ | | | | 10 | 10 | | 10 | 5 | 0–15 |
| Xn(PO₃)₂ | | | | | | 15 | 10 | 5 | 0–20 |
| SiO₂ | | | | | | | | 5 | 0–10 |

The glass blank 10 is preheated in air, at this stage of formation, to a temperature of approximately 400° C. for a period of approximately 3 hours in order to allow the silver ions to migrate to the surfaces of the blank. This is shown in FIGS. 2 and 3 with the heavier concentration of the silver nearer the top and bottom surfaces than at the center of the blank.

A suitable protective film or layer 12 which is inert in an impenetrable by hot hydrogen gas is applied to the polished surface 14 and this layer may be of any desired material. It has been found that the high content of silver in the surface of the glass blank after the reduction step results in a surface which is extremely resistant to abrasion and chemical action as compared to silver coated glass surfaces. The advantage of this charcteristic of the surface of the blank 10 will appear hereinafter. Several materials are available and satisfactory for this protective coating or film, such as magnesium fluoride, aluminum, titanium dioxide and the alloy "Inconel"; however, since a film of magnesium fluoride may be more sharply engraved even for the thinnest lines possible, it is preferred that this material be used. In actual practice, this layer is relatively thin, say of the order of 100 millimicrons thickness and generally is considered transparent. The thin protective films may be applied to the glass by the well known process of evaporation in high vacuum.

Any desired pattern is engraved through the layer 12 and in FIG. 3, this is represented by the numeral 16 and for purposes of this invention, as illustrative only, the pattern will be treated as a fine mesh grid. While there is described and shown engravings which are cut into the protective layer so as to expose the surface 14, it will be readily apparent to those skilled in the art that other methods may be employed in order to accomplish the same result, for example, the photosensitive emulsion process. As shown in FIG. 3, the engravings 16 terminate at the surface 14 of the blank 10 thereby exposing the same to the surrounding atmosphere. The blank is then placed in an oven (not shown) and heated in the presence of hydrogen at a temperature of approximately 300°–400° C. and for a period of 2–3 hours depending upon composition of the glass and the amount of reduced silver that is required. It will be appreciated that the above reducing temperature range is relatively low, but in view of the initial preheating step, wherein the silver ions are made to concentrate at the surfaces, the need for the usual deep penetration of hydrogen for diffusion purposes is minimized. This low range of reducing temperature also permits the use of a thinner layer of the protective material 12 and less care will be necessary in the application thereof.

In actual practice, the silver phosphate content in glass may be varied anywhere between 8%–25% and the preheat and reduction temperatures between 300°–400° C., with the silver content and the temperatures varying in an inverse linear relationship. For example, for a glass blank having an 8% silver phosphate content, temperatures of 400° C. are satisfactory, or for a 25% silver phosphate content, temperatures of 300° C. may be utilized. It will be apparent that the silver content between these limits would require temperatures inversely proportional therewith. It will also be apparent that these values of silver and temperature may be varied in order to achieve a desired ohmic value between 0.001 to 10 ohms/square. To illustrate, a glass blank containing 20% silver which has been preheated and subjected to a reduction temperature of 400° C. would result in a pattern having a resistance of approximately 0.001 ohm/square, whereas with a silver content of 8%, temperatures of 300° C. would result in a resistance of approximately 10 ohm/square.

After the reduction step is completed, the blank 10 is removed from the oven and the protective layer 12 may or may not be removed from the surface 14 of the blank. A portion of the resulting blank is shown in detail in FIG. 4 and whole of the blank is shown in FIG. 6 with the finished grid 18 formed thereon. In FIG. 4, the reduced lines in cross section are designated by the numeral 20 and it will be noted that these lines are made in the surface and are equal in width to the engravings 16. The reduced lines 20 possess the qualities of being durable, chemically stable and highly conductive to the flow of current and may be built up to offer as low as 0.001 ohm/square resistance to the flow of current.

The finished blank 22, as shown in FIG. 6, may serve as a matrix for the formation of fine mesh grids and to this end a suitable zinc parting coat (not shown) may be applied to the polished surface 14 of the blank 10 and the latter immersed in an electroplating tank and subjected to a copper plating process. After the required time interval and after being subjected to appropriate currents and voltages, the blank is removed from the tank and cleaned. As shown in FIG. 5, lines of metal 24 resulting from the plating process have formed upon the reduced lines 20 and these lines 24 will have the same dimension as the reduced lines 20 except for the thickness which will be determined by the length of time during which the blank has been subjected to electroplating process. The lines 24 will form upon the glass surface 14 with relative ease and will be defined by sharp lines and clean surfaces.

With the aid of the zinc parting coating between pattern 18 and the finished grid 24, the latter may be easily stripped from the surface 14 of the matrix 22 and another grid-making step prepared. As previously mentioned, the silver-glass surface of the reduced portions 20 is extremely hard and resistant to abrasion and, in addition, is impervious to etching and normal cutting. Thus, the matrix 22 may be used for the manufacture of a considerable number of grids without any loss of perfection in the formation of the grids.

What is claimed is:

1. An article of manufacture comprising a body of phosphate glass consisting essentially of 8–25 percent by weight silver phosphate, 30–75 percent by weight aluminum phosphate, 10–30 percent by weight alkali metal phosphate, and up to about 25 percent by weight barium phosphate, a chemically reduced selected surface portion having a surface resistivity of less than about 10 ohms per square.

2. An article of manufacture comprising a body of phosphate glass consisting essentially of 8–25 percent by weight silver phosphate, 75 percent by weight aluminum phosphate, 10–30 percent by weight alkali metal phosphate and up to about 25 percent by weight barium phosphate, a selected surface including chemically reduced discrete area portions having a surface resistivity of less than about 10 ohms per square.

3. An article of manufacture comprising a body of phosphate glass consisting essentially of 8–25 percent by weight silver phosphate, 30–75 percent by weight aluminum phosphate, 10–30 percent by weight alkali metal phosphate and up to about 25 percent by weight barium phosphate, a selected surface including a periodical structure of chemically reduced discrete area portions having a surface resistivity of less than about 10 ohms per square.

References Cited in the file of this patent

UNITED STATES PATENTS

| | | |
|---|---|---|
| 2,597,562 | Blodgett | May 20, 1953 |
| 2,659,665 | Parson et al. | Nov. 17, 1953 |
| 2,717,946 | Peck | Sept. 13, 1955 |
| 2,751,477 | Fitzgerald | June 19, 1956 |
| 2,825,634 | Rindone | Mar. 4, 1958 |